United States Patent
Yonemura

(10) Patent No.: US 12,273,453 B2
(45) Date of Patent: Apr. 8, 2025

(54) ISOGENY CALCULATION DEVICE, ISOGENY CALCULATION METHOD, AND COMPUTER PROGRAM PRODUCT

(71) Applicant: KABUSHIKI KAISHA TOSHIBA, Tokyo (JP)

(72) Inventor: Tomoko Yonemura, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 292 days.

(21) Appl. No.: 18/174,634

(22) Filed: Feb. 26, 2023

(65) Prior Publication Data

US 2024/0007288 A1 Jan. 4, 2024

(30) Foreign Application Priority Data

Jul. 1, 2022 (JP) ................................. 2022-106781

(51) Int. Cl.
*H04L 9/32* (2006.01)
*H04L 9/08* (2006.01)
*H04L 9/30* (2006.01)

(52) U.S. Cl.
CPC ............ *H04L 9/3066* (2013.01); *H04L 9/085* (2013.01); *H04L 9/3093* (2013.01); *H04L 9/32* (2013.01); *H04L 9/3263* (2013.01)

(58) Field of Classification Search
CPC ..... H04L 9/3066; H04L 9/085; H04L 9/3093; H04L 9/32; H04L 9/3226; H04L 9/3239; H04L 9/3263; H04L 9/3265

(Continued)

(56) References Cited

U.S. PATENT DOCUMENTS 9,763,295 B2 * 9/2017 Kato .................... H02M 3/156
10,742,421 B1 * 8/2020 Wentz .................. H04L 9/0897
(Continued)

FOREIGN PATENT DOCUMENTS

CA 2483486 C * 12/2013 ............. G06F 7/725
CA 2984390 A1 * 5/2018 ............. G06F 7/725

OTHER PUBLICATIONS

David Jao et al., "Supersingular Isogeny Key Encapsulation," 106 pages, URL: https://csrc.nist.gov/CSRC/media/Projects/post-quantum-cryptography/documents/round-3/submissions/SIKE-Round3.zip (retrieved May 11, 2022).

*Primary Examiner* — Khanh Q Dinh
(74) *Attorney, Agent, or Firm* — Finnegan, Henderson, Farabow, Garrett & Dunner, LLP

(57) ABSTRACT

According to one embodiment, an isogeny calculation device includes a memory and an isogeny calculator. The memory stores, as a pre-calculated value, an intermediate value, among a plurality of intermediate values used for isogeny calculation, which is determined from an elliptic point T obtained by repeatedly performing L-point multiplication (where L is a positive integer) and M-isogeny (where M is a positive integer) on an elliptic point S serving as a kernel of the isogeny. The isogeny calculator identifies the elliptic point T serving as the kernel of the M-isogeny according to lower e digits (where e is a positive integer) of an L-adic representation of a secret key sk that determines the elliptic point S, reads the pre-calculated value determined from the elliptic point T from the memory, and performs at least one of calculations of the L-point multiplication and the M-isogeny using the pre-calculated value read from the memory.

12 Claims, 9 Drawing Sheets

(58) Field of Classification Search
USPC .......................................................... 713/190
See application file for complete search history.

(56) References Cited

U.S. PATENT DOCUMENTS

| | | | |
|---|---|---|---|
| 10,805,081 B1 * | 10/2020 | de Quehen | H04L 9/0844 |
| 10,812,264 B1 * | 10/2020 | de Quehen | H04L 9/3066 |
| 10,812,265 B1 * | 10/2020 | de Quehen | H04L 9/3013 |
| 11,032,074 B2 | 6/2021 | Koziel | |
| 2021/0306146 A1 * | 9/2021 | Chen | H04L 9/0869 |
| 2021/0312055 A1 * | 10/2021 | Kloth | H04L 9/0866 |
| 2022/0198018 A1 * | 6/2022 | Wentz | H04L 9/3268 |

* cited by examiner

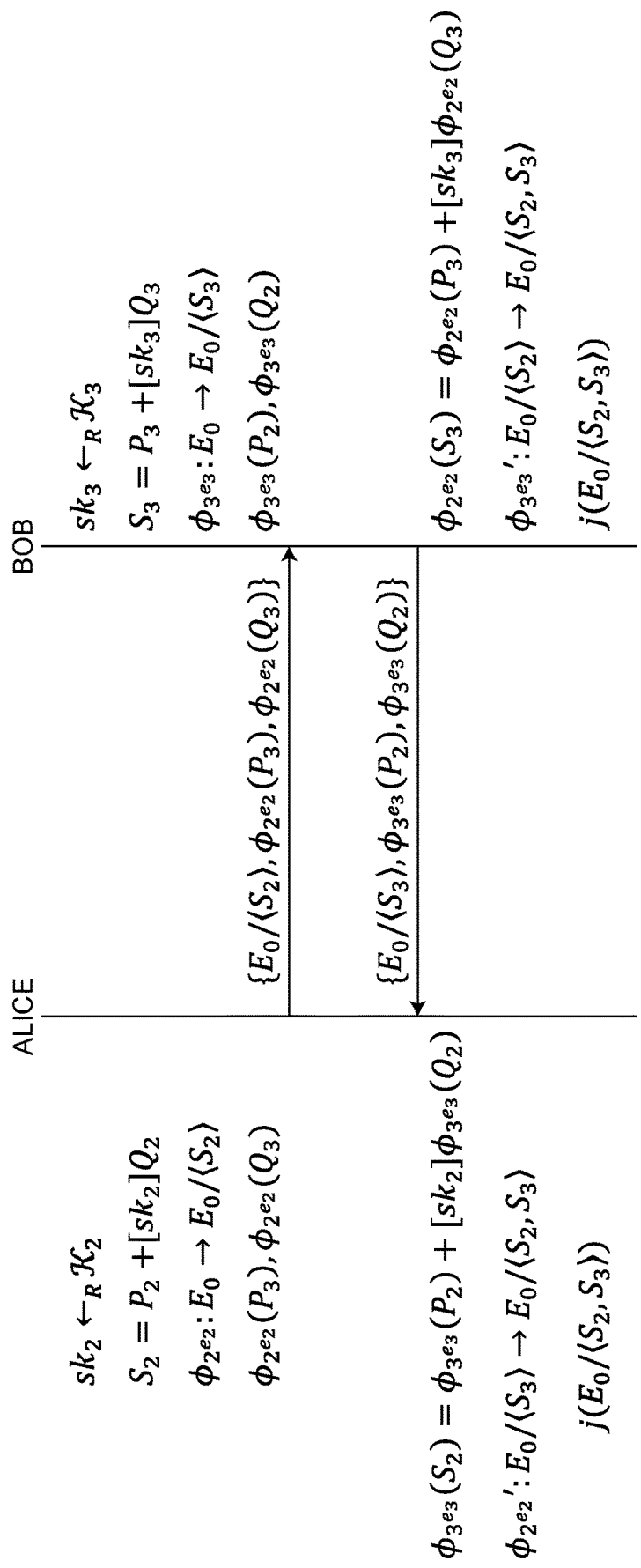

FIG.2

---
Algorithm A: $2^{e_2}$ -ISOGENY CALCULATION
---

Input: $E_0, S_2, P_3, Q_3$

Output: $E_0/\langle S_2 \rangle, \phi_{2^{e_2}}(P_3), \phi_{2^{e_2}}(Q_3)$

1: $E \leftarrow E_0, S \leftarrow S_2, P'_3 \leftarrow P_3, Q'_3 \leftarrow Q_3$ 2: for $i = e_2$ -1 down to 0 by -1 do 3: $T \leftarrow [2^i]S$ 4: $E \leftarrow E/\langle T \rangle$ //CALCULATE COEFFICIENT OF ELLIPTIC CURVE AT DESTINATION OF MAPPING BY 2-ISOGENY 5: $S \leftarrow \phi_2(S)$ //CALCULATE POINT MAPPED BY 2-ISOGENY 6: $(P'_3, Q'_3) \leftarrow (\phi_2(P'_3), \phi_2(Q'_3))$ //CALCULATE POINT MAPPED BY 2-ISOGENY 7: end for 8: return $E, P'_3, Q'_3$
---

FIG.3

| REPETITION | $i$ | $T$ | ORDER OF $T$ | $E$ | $S$ | ORDER OF $S$ |
|---|---|---|---|---|---|---|
| FIRST | 2 | $[4]S_2$ | 2 | $E_0/\langle[4]S_2\rangle$ | $\phi_2(S_2)$ | 4 |
| SECOND | 1 | $[2]\phi_2(S_2)$ | 2 | $E_0/\langle[4]S_2, [2]\phi_2(S_2)\rangle$ | $\phi_{2^2}(S_2)$ | 2 |
| THIRD | 0 | $\phi_{2^2}(S_2)$ | 2 | $E_0/\langle[4]S_2, [2]\phi_2(S_2), \phi_{2^2}(S_2)\rangle$ | $\phi_{2^3}(S_2)$ | 1 |

FIG.5

| LOWER 1 BIT | LOWER 2 BITS | LOWER 3 BITS |
|---|---|---|
| $[2^{e-1}]P + [0][2^{e-1}]Q$ | $\phi_0([2^{e-2}]P) + [00]_2\phi_0([2^{e-2}]Q)$ | $\phi_{00}\phi_0([2^{e-3}]P) + [000]_2\phi_{00}\phi_0([2^{e-3}]Q)$ |
| | | $\phi_{00}\phi_0([2^{e-3}]P) + [100]_2\phi_{00}\phi_0([2^{e-3}]Q)$ |
| | $\phi_0([2^{e-2}]P) + [10]_2\phi_0([2^{e-2}]Q)$ | $\phi_{10}\phi_0([2^{e-3}]P) + [010]_2\phi_{10}\phi_0([2^{e-3}]Q)$ |
| | | $\phi_{10}\phi_0([2^{e-3}]P) + [110]_2\phi_{10}\phi_0([2^{e-3}]Q)$ |
| $[2^{e-1}]P + [1][2^{e-1}]Q$ | $\phi_1([2^{e-2}]P) + [01]_2\phi_1([2^{e-2}]Q)$ | $\phi_{01}\phi_1([2^{e-3}]P) + [001]_2\phi_{01}\phi_1([2^{e-3}]Q)$ |
| | | $\phi_{01}\phi_1([2^{e-3}]P) + [101]_2\phi_{01}\phi_1([2^{e-3}]Q)$ |
| | $\phi_1([2^{e-2}]P) + [11]_2\phi_1([2^{e-2}]Q)$ | $\phi_{11}\phi_1([2^{e-3}]P) + [011]_2\phi_{11}\phi_1([2^{e-3}]Q)$ |
| | | $\phi_{11}\phi_1([2^{e-3}]P) + [111]_2\phi_{11}\phi_1([2^{e-3}]Q)$ |

FIG.7

| NUMBER | PRE-CALCULATED VALUE(S) | CALCULATION TARGET | NOTES |
|---|---|---|---|
| 0 | ELLIPTIC POINT T | INTERMEDIATE VALUE K, INTERMEDIATE VALUE AC, AND L-ISOGENY OF ELLIPTIC POINT DETERMINED BY SECRET KEY AND PUBLIC PARAMETERS | • INTERMEDIATE VALUE K AND INTERMEDIATE VALUE AC ARE CALCULATED<br>• L-ISOGENY OF ELLIPTIC POINT DETERMINED BY SECRET KEY AND PUBLIC PARAMETERS IS CALCULATED e TIMES |
| 1 | ELLIPTIC POINT T AND L^e-ISOGENY OF PUBLIC PARAMETERS | INTERMEDIATE VALUE K, INTERMEDIATE VALUE AC, AND L-ISOGENY OF ELLIPTIC POINT DETERMINED BY SECRET KEY | • INTERMEDIATE VALUE K AND INTERMEDIATE VALUE AC ARE CALCULATED<br>• L-ISOGENY OF ELLIPTIC POINT DETERMINED BY SECRET KEY IS CALCULATED e TIMES<br>• L^e-ISOGENY OF PUBLIC PARAMETERS IS READ ONCE |
| 2 | ELLIPTIC POINT T, INTERMEDIATE VALUE AC, AND L^e-ISOGENY OF PUBLIC PARAMETERS | INTERMEDIATE VALUE K AND L-ISOGENY OF ELLIPTIC POINT DETERMINED BY SECRET KEY | • INTERMEDIATE VALUE AC IS READ, AND INTERMEDIATE VALUE K IS CALCULATED<br>• L-ISOGENY OF ELLIPTIC POINT DETERMINED BY SECRET KEY IS CALCULATED e TIMES<br>• L^e-ISOGENY OF PUBLIC PARAMETERS IS READ ONCE |
| 3 | INTERMEDIATE VALUE K, INTERMEDIATE VALUE AC, AND L^e-ISOGENY OF PUBLIC PARAMETERS | L-ISOGENY OF ELLIPTIC POINT DETERMINED BY SECRET KEY | • INTERMEDIATE VALUE K AND INTERMEDIATE VALUE AC ARE READ<br>• L-ISOGENY OF ELLIPTIC POINT DETERMINED BY SECRET KEY IS CALCULATED e TIMES<br>• L^e-ISOGENY OF PUBLIC PARAMETERS IS READ ONCE |
| 4 | INTERMEDIATE VALUE K, INTERMEDIATE VALUE AC, AND L^e-ISOGENY OF PUBLIC PARAMETERS | L-ISOGENY OF ELLIPTIC POINT DETERMINED BY SECRET KEY | • INTERMEDIATE VALUE K IS READ e TIMES, AND INTERMEDIATE VALUE AC IS READ ONCE<br>• L-ISOGENY OF ELLIPTIC POINT DETERMINED BY SECRET KEY IS CALCULATED e TIMES<br>• L^e-ISOGENY OF PUBLIC PARAMETERS IS READ ONCE |

FIG.8

| NUMBER | PRE-CALCULATED VALUE (S) | CALCULATION TARGET | NOTES |
|---|---|---|---|
| 0' | ELLIPTIC POINT T | INTERMEDIATE VALUE K, INTERMEDIATE VALUE AC, AND L-ISOGENY OF ELLIPTIC POINT DETERMINED BY SECRET KEY | ·INTERMEDIATE VALUE K AND INTERMEDIATE VALUE AC ARE CALCULATED ·L-ISOGENY OF ELLIPTIC POINT DETERMINED BY SECRET KEY IS CALCULATED e TIMES |
| 2' | ELLIPTIC POINT T AND INTERMEDIATE VALUE AC | INTERMEDIATE VALUE K AND L-ISOGENY OF ELLIPTIC POINT DETERMINED BY SECRET KEY | ·INTERMEDIATE VALUE AC IS READ, AND INTERMEDIATE VALUE K IS CALCULATED ·L-ISOGENY OF ELLIPTIC POINT DETERMINED BY SECRET KEY IS CALCULATED e TIMES |
| 3' | INTERMEDIATE VALUE K AND INTERMEDIATE VALUE AC | L-ISOGENY OF ELLIPTIC POINT DETERMINED BY SECRET KEY | ·INTERMEDIATE VALUE K AND INTERMEDIATE VALUE AC ARE READ ·L-ISOGENY OF ELLIPTIC POINT DETERMINED BY SECRET KEY IS CALCULATED e TIMES |
| 4' | INTERMEDIATE VALUE K AND INTERMEDIATE VALUE AC | L-ISOGENY OF ELLIPTIC POINT DETERMINED BY SECRET KEY | ·INTERMEDIATE VALUE K IS READ e TIMES, AND INTERMEDIATE VALUE AC IS READ ONCE ·L-ISOGENY OF ELLIPTIC POINT DETERMINED BY SECRET KEY IS CALCULATED e TIMES |

ISOGENY CALCULATION DEVICE, ISOGENY CALCULATION METHOD, AND COMPUTER PROGRAM PRODUCT

CROSS-REFERENCE TO RELATED APPLICATIONS

This application is based upon and claims the benefit of priority from Japanese Patent Application No. 2022-106781, filed on Jul. 1, 2022; the entire contents of which are incorporated herein by reference.

FIELD

Embodiments described herein relate generally to an isogeny calculation device, an isogeny calculation method, and a computer program product.

BACKGROUND

In recent years, research on quantum computing has been accelerated by entry of major information technology (IT) companies. If quantum computers are developed that break Rivest-Shamir-Adleman (RSA) cryptosystems and elliptic curve cryptosystems serving as currently widely used public-key cryptosystems, information security systems using the RSA cryptosystems or the elliptic curve cryptosystems will no longer be safe. Therefore, research and development of quantum-resistant cryptosystems (also called quantum-resistant public key cryptosystems or post-quantum cryptosystems) are underway in preparation for the case where the RSA cryptosystems and the elliptic curve cryptosystems are required to be replaced with the quantum-resistant cryptosystems. One of the possible candidates for the quantum-resistant cryptosystems is isogeny-based cryptosystems, the safety of which being based on isogeny problems.

However, the conventional technologies have a difficulty in improving the processing speed of isogeny calculation.

BRIEF DESCRIPTION OF THE DRAWINGS

FIG. 1 is a diagram illustrating an example of a supersingular isogeny Diffie-Hellman key exchange (SIDH) key sharing process;

FIG. 2 is a chart illustrating an example of a $L^{e\_L}$-isogeny calculation algorithm (when L=2);

FIG. 3 is a chart illustrating an example of values represented by variables of the algorithm in FIG. 2 (when $e\_2=3$);

FIG. 5 is a chart illustrating an example of pre-calculated values of an embodiment;

FIG. 7 is a chart illustrating examples of variations of the pre-calculated values in a public key generation process of the embodiment;

FIG. 8 is a chart illustrating examples of variations of the pre-calculated values in a shared key establishment process of the embodiment.

DETAILED DESCRIPTION

Figure 4:
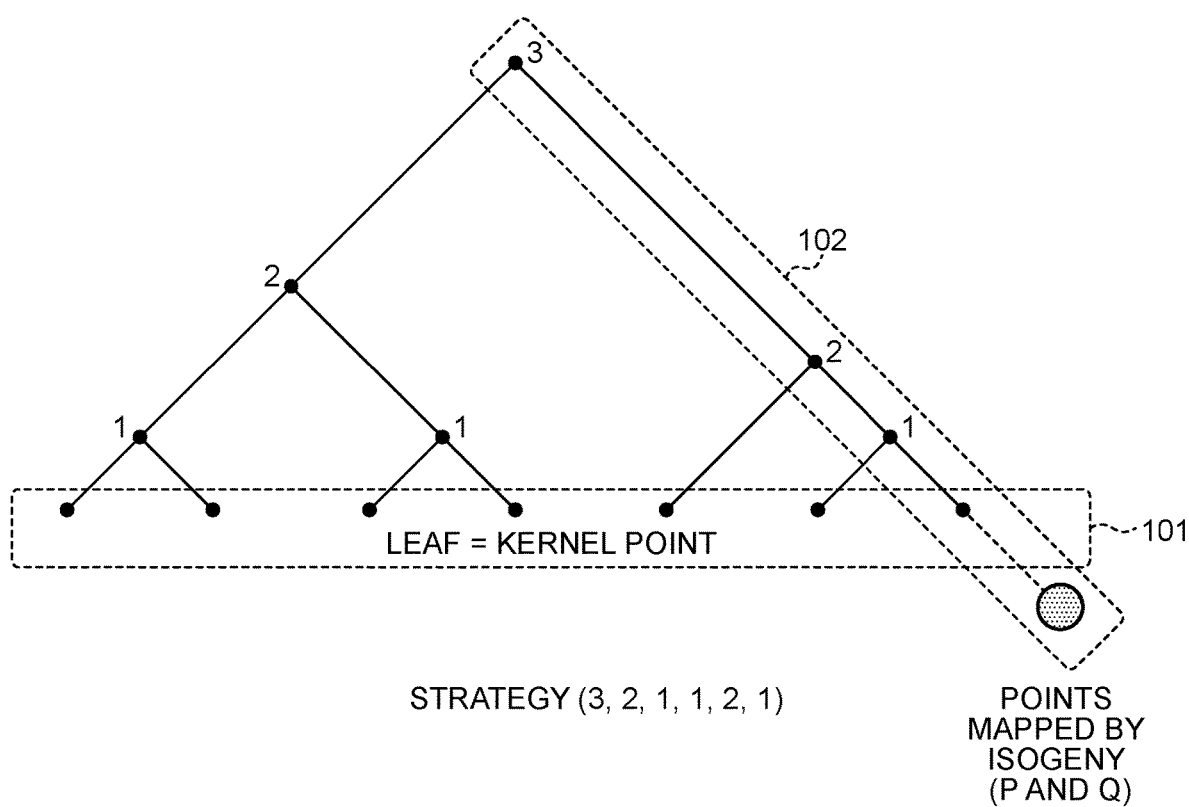
FIG. 4 is a diagram illustrating an example of a tree structure indicating a calculation order of the $L^{e\_L}$-isogeny calculation (when $e\_L=7$)

In general, according to one embodiment, an isogeny calculation device includes a memory and an isogeny calculator. The memory is configured to store, as a pre-calculated value, an intermediate value, among a plurality of intermediate values used for isogeny calculation, which is determined from an elliptic point T obtained by repeatedly performing L-point multiplication (where L is a positive integer) and M-isogeny (where M is a positive integer) on an elliptic point S serving as a kernel of the isogeny. The isogeny calculator is configured to identify the elliptic point T serving as the kernel of the M-isogeny according to lower e digits (where e is a positive integer) of an L-adic representation of a secret key sk that determines the elliptic point S, read the pre-calculated value determined from the elliptic point T from the memory, and perform at least one of calculations of the L-point multiplication and the M-isogeny by using the pre-calculated value read from the memory.

Exemplary embodiments of an isogeny calculation device, an isogeny calculation method, and a computer program product will be explained below in detail with reference to the accompanying drawings. The present invention is not limited to the following embodiments.

Isogeny-based cryptography is quantum-resistant cryptography, the safety of which being based on isogeny problems. For example, the supersingular isogeny key encapsulation (SIKE) is a candidate standardization scheme for the quantum-resistant cryptography by the National Institute of Standards and Technology (NIST). In the isogeny cryptography, scalar multiplication and isogeny calculation are performed (performed by a combination of L-point multiplication and L-isogeny calculation, where L is a positive integer) for an elliptic point on an elliptic curve. Herein, an elliptic point means a point on an elliptic curve.

The isogeny-based cryptography has an advantage that the key size is smaller than that of the quantum-resistant cryptography (lattice-based cryptography and code-based cryptography), but has a disadvantage that the number of execution cycles is larger for key generation, encryption, decryption, key encapsulation, and key decapsulation. Therefore, in order to alleviate the disadvantage, the isogeny calculation device of the embodiment increases the speed of the isogeny calculation that serves as a main process of the isogeny-based cryptography.

In the isogeny-based cryptography, a key sharing scheme is used to configure public-key cryptography and a key encapsulation mechanism (KEM). For example, in the SIKE, supersingular isogeny Diffie-Hellman key exchange (SIDH) is used as the key sharing scheme. The main process of the isogeny-based cryptography algorithm is in the key-sharing scheme. Therefore, an example of a key-sharing process of the SIDH will first be briefly described.

FIG. 1 is a diagram illustrating an example of the SIDH key sharing process.

In the SIDH, a key (hereinafter, called "shared key") is secretly shared between Alice and Bob. Alice and Bob represent fictional parties (such as information-processing devices) that perform cryptographic communication, and Alice and Bob will be used in the description of the embodiment, according to the customary practice.

The shared key is calculated using an own secret key and a public key (public parameters) of the other party (communicating partner). Let the public parameters be a positive integer L, a positive integer $e\_L$, an elliptic curve $E\_0$, an elliptic point $P\_L$, and an elliptic point $Q\_L$. The elliptic points $P\_L$ and $Q\_L$ are points having an order $L^{e\_L}$ (L to the power of $e\_L$, where ^ represents "to the power of") on the elliptic curve $E\_0$. The secret key space is represented as $K\_L=\{0, 1, 2, \ldots, L^{e\_L}-1\}$.

A j-invariant of an elliptic curve $E\_0/<S\_L, S\_L'>$ finally obtained for two positive integers L and L' is equal between a case where the elliptic curve $E\_0$ is mapped to an elliptic curve $E\_0/<S\_L>$ by the isogeny determined by an elliptic point $S\_L$ and then mapped to the elliptic curve $E\_0/<S\_L, S\_L'>$ by the isogeny determined by an elliptic point $S\_L'$ and a case where the elliptic curve $E\_0$ is mapped to $E\_0/<S\_L'>$ by the isogeny determined by the elliptic point $S\_L'$ and then mapped to the elliptic curve $E\_0/<S\_L, S\_L'>$ by the isogeny determined by the elliptic point $S\_L$. This j-invariant serves as the shared key. The key sharing scheme includes two steps of public key generation and shared key establishment.

Public Key Generation Step

For example, let L=2 and L'=3. The elliptic curve $E\_0$, an elliptic point $P\_2$, an elliptic point $Q\_2$, an elliptic point $P\_3$, and an elliptic point $Q\_3$ are given by the public parameters.

Alice obtains a random number (secret key) $sk\_2$ from a secret key space $K\_2$, and calculates an elliptic point $S\_2=P\_2+[sk\_2]Q\_2$ determined by the random number $sk\_2$ using the scalar multiplication. [sk]Q denotes the scalar multiplication between a scalar value sk and the elliptic point Q. Alice calculates secret isogeny $\varphi\_2^e\_2:E\_0 \rightarrow E\_0/<S\_2>$ having a group $<S\_2>$ generated at the elliptic point $S\_2$ as a kernel.

Bob obtains a random number $sk\_3$ from a secret key space $K\_3$, and calculates an elliptic point $S\_3=P\_3+[sk\_3]Q\_3$ determined by the random number $sk\_3$ using the scalar multiplication. Bob calculates secret isogeny $\varphi\_3^e\_3: E\_0 \rightarrow E\_0/<S\_3>$ having a group $<S\_3>$ generated at the elliptic point $S\_3$ as a kernel.

Alice calculates and publishes public keys $pk\_2=\{E\_0/<S\_2>, \varphi\_2^e\_2 (P\_3), \varphi\_2^e\_2 (Q\_3)\}$, and Bob calculates and publishes public keys $pk\_3=\{E\_0/<S\_3>, \varphi\_3^e\_3 (P\_2), \varphi\_3^e\_3 (Q\_2)\}$.

Shared Key Establishment Step

Alice calculates an elliptic point $\varphi\_3^e\_3(S\_2)=\varphi\_3^e\_3 (P\_2)+[sk\_2] \varphi\_3^e\_3(Q\_2)$ determined by the random number $sk\_2$ from elliptic points $\varphi\_3^e\_3(P\_2)$ and $\varphi\_3^e\_3 (Q\_2)$ in the public key $pk\_3$ of Bob and the secret key $sk\_2$ of Alice, using the scalar multiplication. Alice calculates secret isogeny $\varphi'\_2^e\_2:E\_0/<S\_3> \rightarrow E\_0/<S\_2, S\_3>$ having a group $<\varphi\_3^e\_3(S\_2)>$ generated at the elliptic point $\varphi\_3^e\_3(S\_2)$ as a kernel.

Bob calculates an elliptic point $\varphi\_2^e\_2(S\_3)=\varphi\_2^e\_2 (P\_3)+[sk\_3]\varphi\_2^e\_2(Q\_3)$ determined by the random number $sk\_3$ from the public keys $\varphi\_2^e\_2 (P\_3)$ and $\varphi\_2^e\_2 (Q\_3)$ of Alice and the secret key $sk\_3$ of Bob, using the scalar multiplication. Bob calculates secret isogeny $\varphi'\_3^e\_3:E\_0/<S\_2> \rightarrow E\_0/<S\_2, S\_3>$ having a group $<\varphi\_2^e\_2(S\_3)>$ generated at the elliptic point $\varphi\_2^e\_2 (S\_3)$ as a kernel.

Hereafter, at the public key generation step mentioned above, $isogen\_2(sk\_2) \rightarrow pk\_2$ denotes the process (public key generation process) to generate the public key of Alice for the secret key of Alice, and $isogen\_3(sk\_3) \rightarrow pk\_3$ denotes the process to generate the public key of Bob for the secret key of Bob.

At the shared key establishment step, $isoex\_2(pk\_3, sk\_2) \rightarrow j$ denotes the process (shared key establishment process) to calculate the shared key (j-invariant) using the public key of Bob and the secret key of Alice, and $isoex\_3 (pk\_2, sk\_3) \rightarrow j$ denotes the process to calculate the shared key using the public key of Alice and the secret key of Bob.

As described above, in the public key generation process $isogen\_L(sk\_L) \rightarrow pk\_L$ and the shared key establishment process $isoex\_L(pk\_L', sk\_L) \rightarrow j$, the scalar multiplication using a secret key $sk\_L$ as a scalar value and the $L^e\_L$-isogeny calculation are performed. The $L^e\_L$-isogeny calculation is a process that occupies a large proportion of the number of execution cycles. While the following description will be made by exemplifying the $L^e\_L$-isogeny calculation in the public key generation process, the same also applies to the $L^e\_L$-isogeny calculation in the shared key establishment process.

In the $L^e\_L$-isogeny calculation, secret isogeny $\varphi\_L^e\_L:E\_0 \rightarrow E\_0/<S\_L>$ having the elliptic point $S\_L$ determined by the secret key $sk\_L$ as a kernel is calculated. The $L^e\_L$-isogeny calculation is performed by combining the L-point multiplication with the L-isogeny calculation.

Specifically, L-isogeny $\varphi\_L$ having an elliptic point $[L^(e\_L-1)]S\_L$ obtained by performing the L-point multiplication on the elliptic point $S\_L$ by $(e\_L-1)$ times as a kernel is first calculated.

Then, the L-isogeny $\varphi\_L$ having, as a kernel, an elliptic point $[L^(e\_L-2)]\varphi\_L(S\_L)$ obtained by performing the L-point multiplication by $(e\_L-2)$ times on an elliptic point $\varphi\_L(S\_L)$ obtained by mapping the elliptic point $S\_L$ by the L-isogeny is calculated. In the same way, the L-isogeny $\varphi\_L$ having, as a kernel, an elliptic point $[L^(e\_L-3)] \varphi\_L^2(S\_L)$ obtained by performing the L-point multiplication by $(e\_L-3)$ times on an elliptic point $\varphi\_L^2(S\_L)$ obtained by mapping the elliptic point $\varphi\_L(S\_L)$ by the L-isogeny is calculated. By repeating such operations a total of $e\_L$ times, public keys $pk\_L=\{E\_0/<S\_L>, \varphi\_L^e\_L(P\_L'), \varphi\_L^e\_L (Q\_L')\}$ are obtained.

FIG. 2 is a chart illustrating an example of a $L^e\_L$-isogeny calculation algorithm (when L=2). FIG. 3 is a chart illustrating an example of values represented by variables of the algorithm in FIG. 2 (when $e\_2=3$). As illustrated in the examples in FIGS. 2 and 3, $2^3$-isogeny calculation is performed by combining point doubling with 2-isogeny calculation.

In the $L^e\_L$-isogeny calculation, it is essential to calculate the $e\_L$ kernel elliptic points $[L^(e\_L-1)]S\_L$, $[L^(e\_L-2)]\varphi\_L(S\_L)$, $[L^(e\_L-3)] \varphi\_L^2(S\_L)$, ..., $\varphi\_L^(e\_L-1)(S\_L)$, and the order of the calculation is not limited to that of the algorithm in FIG. 2 mentioned above. For example, it is known that letting the left-hand side denote the L-point multiplication and the right-hand side denote the L-isogeny calculation, the isogeny calculation is performed in the calculation order based on a tree structure with the kernel elliptic points serving as leaves (Supersingular Isogeny Key Encapsulation, online, searched on May 11, 2022, Internet <URL: https://csrc.nist.gov/CSRC/media/Projects/post-quantum-cryptography/documents/round-3/submissions/SIKE-Round3.zip>; hereinafter referred to as "Non-Patent Literature 1").

FIG. 4 is a diagram illustrating an example of the tree structure indicating the calculation order of the $L^e\_L$-isogeny calculation (when $e\_L=7$). A point that moves in a lower-left direction in the tree structure represents an elliptic point obtained by performing the L-point multiplication. A point that moves in a lower-right direction in the tree structure represents an elliptic point obtained by calculating the L-isogeny.

The leaves of the tree structure (in the example in FIG. 4, points in a portion 101 included in the tree structure) represent the elliptic points used as the kernels in the calculation process of the points (P and Q) mapped by isogeny. The points in a portion 102 included in the tree structure represent the elliptic points obtained by calculating the L-isogeny.

A sequence of positive integers representing a tree structure, for example, (3, 2, 1, 1, 2, 1) at e_L=7, is called a strategy. The strategy specifies the tree structure that represents the elliptic points (hereafter, "intermediate values") used in the L^e_L-isogeny calculation.

Improvements to the L^e_L-isogeny calculation known so far include a contrivance for the tree structure (method for enabling batch processing, by U.S. Pat. No. 10,812,265) and a contrivance for the intermediate values (method for saving a memory by sharing Z-coordinates of a plurality of intermediate values, by U.S. Pat. No. 11,032,074).

The embodiment is an embodiment related to a technology for implementation of the isogeny-based cryptography processing. The following describes the embodiment to increase the speed of the L^e_L-isogeny calculation by performing pre calculation.

Using the fact that the elliptic points P_L and Q_L serving as the public parameters are known, the isogeny calculation device of the embodiment pre-calculates elliptic points [L^(e_L−1)]S_L, [L^(e_L−2)]φ_L(S_L), [L^(e_L−3)]φ_L^2 (S_L), . . . , [L^(e_L−e)]φ_L^(e−1) (S_L) among the kernel e_L elliptic points [L^(e_L−1)]S_L, [L^(e_L−2)]φ_L(S_L), [L^(e_L−3)]φ_L^2(S_L), . . . , φ_L^(e_L−1) (S_L) of the L-isogeny, as a smaller positive integer e<e_L. The isogeny calculation device of the embodiment reduces the number of calculations of the L-point multiplication and the L-isogeny in the L^e_L-isogeny calculation by reading the pre-calculated values.

L^e_L-Isogeny Calculation

Assume that the tree structure is given as the strategy. The elliptic point S_L=P_L+[sk_L]Q_L corresponds to a root of the tree structure. The secret key sk_L determines the elliptic point S_L. The elliptic point S_L is a point having the order L^e_L on the elliptic curve E_0. The elliptic point S_L can take L^e_L values from the secret key space K_L= {0, 1, 2, . . . , L^e_L−1}.

The elliptic point [L^(e_L−1)]S_L corresponds to the leftmost leaf of the tree structure. Since the order of the elliptic point S_L is L^e_L, the order of the elliptic point [L^(e_L−1)]S_L is L. When trunc(sk_L, e) denotes truncated lower e digits of a cardinal number L of sk_L, Expression (1) below holds.

$$[L^\wedge(e\_L-1)]S\_L \quad (1)$$
$$= L^\wedge(e\_L-1)]P\_L + [L^\wedge(e\_L-1)][sk\_L]Q\_L$$
$$= [L^\wedge(e\_L-1)]P\_L$$
$$+ [trunc(sk\_L, 1)][L^\wedge(e\_L-1)]Q\_L$$

From Expression (1) above, the lower one digit of the secret key sk_L determines the elliptic point [L^(e_L−1)] S_L.

The elliptic point [L^(e_L−2)]φ_L(S_L) corresponds to the second leftmost leaf, and the order is L. Expression (2) below holds.

$$[L^\wedge(e\_L-2)]\varphi\_L(s\_1) \quad (2)$$
$$= [L^\wedge(e\_L-2)]\varphi\_L(P\_L)$$
$$+ [L^\wedge(e\_L-2)]\varphi\_L[sk\_L]Q\_L]$$
$$= \varphi\_L([L^\wedge(e\_L-2)] P\_L)$$
$$+ [trunc(sk\_L, 2)\varphi\_L[L^\wedge(e\_L-2)]Q\_L]$$

From Expression (2) above, the lower two digits of the secret key sk_L determines the elliptic point [L^(e_L−2)] φ_L(S_L).

In the same way, an elliptic point [L^(e_L−e)]φ_L^(e−1) (S_L) corresponds to the e-th leftmost leaf, and the order of this elliptic point is L, which is determined by the lower e digits of the secret key sk_L.

For example, when L=2, an elliptic point [2^(e_2−1)]S_2 can take two values of [2^(e_2−1)]P_2+[0] [2^(e_2−1)]Q_2 and [2^(e_2−1)]P_2+[1] [2^(e_2−1)]Q_2.

An elliptic point [2^(e_2−2)]φ_2(S_2) can take four values. Specifically, the value of the first point is φ_2([2^(e_2−2)]P_2)+[00]2φ_2([2^(e_2−2)]Q_2). In this expression, [00]_2 represents scalar multiplication using the lower two digits of the binary representation of the secret key sk_2, and the same applies below. The value of the second point is φ_2([2^(e_2−2)]P_2)+[10] _2φ_2([2^(e_2−2)]Q_2). The 2-isogeny of these two points (φ_0 in FIG. 5 to be explained below) has a kernel at [2^(e_2−1)]P_2+[0][2^(e_2−1)]Q_2.

The value of the third point is φ_2([2^(e_2−2)]P_2)+ [01]_2φ_2([2^(e_2−2)]Q_2). The value of the fourth point is φ_2([2^(e_2−2)]P_2)+[11]_2φ_2([2^(e_2−2)]Q_2). The 2-isogeny of these two points (φ_1 in FIG. 5 to be explained below) has a kernel at [2^(e_2−1)]P_2+[1][2^(e_2−1)]Q_2.

In the implementation, the elliptic points determined by the lower e digits of the secret key sk_L are held as the pre-calculated values, as described above. If the memory for storing the pre-calculated values is limited, the elliptic points to be held as the pre-calculated values may be determined, for example, based on the number of patterns of values that can be taken among those of elliptic points (elliptic points T serving as the kernels of the L-isogeny) that can be represented by leaves of the tree structure.

FIG. 5 is a chart illustrating an example of the pre-calculated values of the embodiment. The example in FIG. 5 illustrates an example of elliptic points determined by the lower three digits of the secret key sk_2. The locations in FIG. 5 have nothing to do with the arrangement in the memory. In the case of 128-bit security, the elliptic point has 434*2*2 bits (approximately 220 bytes).

Figure 6:
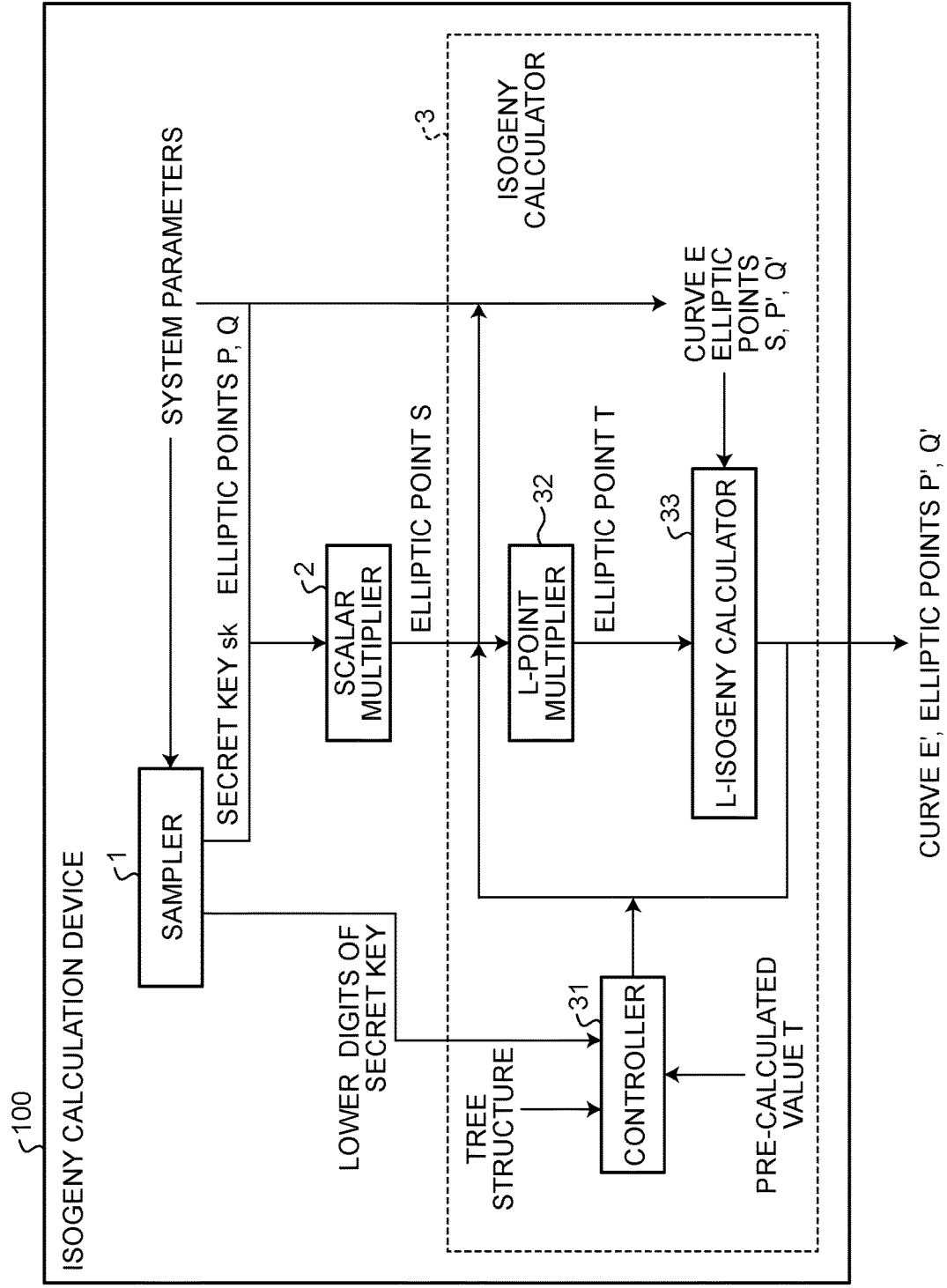
FIG. 6 is a diagram illustrating an exemplary functional configuration of an isogeny calculation device of the embodiment.

Example of Functional Configuration FIG. 6 is a diagram illustrating an exemplary functional configuration of the isogeny calculation device of the embodiment. An isogeny calculation device 100 of the embodiment includes a sampler 1, a scalar multiplier 2, and an isogeny calculator 3. The isogeny calculator 3 includes a controller 31, an L-point multiplier 32, and an L-isogeny calculator 33.

The sampler 1 obtains the secret key sk from the secret key space K included in system parameters, and supplies the secret key sk to the scalar multiplier 2. The sampler 1 also supplies the lower e digits of the secret key sk to the controller 31.

The scalar multiplier 2 performs the scalar multiplication to calculate the elliptic point S using the secret key sk received from the sampler 1 and the elliptic points P and Q included in the system parameters, and supplies the result to the isogeny calculator 3.

The isogeny calculator 3 performs the L^e_L-isogeny calculation.

The controller 31 controls the operations of the L-point multiplier 32 and the L-isogeny calculator 33 based on the positive integer e<e_L, the tree structure given as the strategy (refer to FIG. 4), pre-calculated values T (values that can be taken by the elliptic points [L^(e_L−1)]S_L, [L^(e_L−2)]φ_L(S_L), [L^(e_L−3)]φ _L^2(S_L), . . . , [L^(e_L−e)]φ_L^(e−1) (S_L), refer to FIG. 5, for example), and the lower digits of the secret key (the lower e digits of the secret key sk) received from the sampler 1. Thus, the controller 31 performs the L-point multiplication and the L-isogeny calculation in the L^e_L-isogeny calculation. The elliptic points [L^(e_L−1)]S_L, [L^(e_L−2)] φ_L(S_L), [L^(e_L−3)]φ_L^2(S_L), . . . , [L^(e_L−e)]φ_L^(e−1) (S_L) are obtained by performing the L-point multiplication and the L-isogeny calculation a total of (e_L−1) times on the elliptic point S_L. The elliptic point [L^(e_L−e)]φ_L^(e−1) (S_L) is obtained by performing the L-point multiplication by (e_L−e) times and the L-isogeny calculation on the elliptic point S_L.

The controller 31 controls the operations of the L-point multiplier 32 and the L-isogeny calculator 33 according to Algorithm A (FIG. 2), for example. At this time, if each of the pre-calculated values T is available (in the iteration from i=e_L−1 to i=e_L−e in FIG. 2), the controller 31 reads the pre-calculated value T determined by trunc(sk_L, e_L−i) as an elliptic point T serving as the kernel, and supplies the pre-calculated value T to the L-point multiplier 32, without performing the L-point multiplication (Process Step 3 in FIG. 2).

Upon receiving the elliptic point S_L from the scalar multiplier 2, the L-point multiplier 32 calculates the elliptic point T by performing the L-point multiplication of the elliptic point S_L, and supplies the elliptic point T to the L-isogeny calculator 33. If the pre-calculated value T is available (in the iteration from i=e_L−1 to i=e_L−e), the L-point multiplier 32 supplies the pre-calculated value T read by the controller 31 to the L-isogeny calculator 33 without performing the L-point multiplication.

The L-isogeny calculator 33 performs the L-isogeny calculation using the elliptic curve E, elliptic points S, P', and Q', and the elliptic point T received from the L-point multiplier 32 (Process Steps 4 to 6 in FIG. 2).

If the pre-calculated value T is not available (in the iteration from i=e_L−e−1 to i=0 in FIG. 2), the controller 31 performs the calculation of each process step in FIG. 2 by operating the L-point multiplier 32 and the L-isogeny calculator 33 as usual.

The following describes Variations 1 to 4 of the pre-calculated value held by the isogeny calculation device 100. The above has been described by exemplifying the case where the pre-calculated values are the values that can be taken by the elliptic points T ([L^(e_L−1)]S_L, [L^(e_L−2)] φ_L(S_L), [L^(e_L−3)]φ_L^2(S_L), . . . , [L^(e_L−e)] φ_L^(e−1) (S_L), refer to FIG. 5, for example). However, the pre-calculated values are not limited to the values that can be taken by these elliptic points T, but may also be intermediate values determined from the elliptic points T obtained by repeatedly performing the L-point multiplication (where L is a positive integer) and M-isogeny (where M is a positive integer) on the elliptic points S serving as kernels of the isogeny, among a plurality of intermediate values used for the isogeny calculation.

The pre-calculated values of the embodiment may be read from a storage device in the isogeny calculation device 100 (for example, a memory of the isogeny calculation device 100) or a storage device outside the isogeny calculation device 100 (for example, a server device).

Variation 1

In the example of Variation 1, the isogeny calculation device 100 pre-calculates (holds as the pre-calculated value) not only the elliptic point T at Process Step 3, but also the elliptic point used at Process Step 6 (elliptic point obtained by mapping the public parameters by L^e-isogeny) in Algorithm A in FIG. 2. That is, the isogeny calculation device 100 holds the elliptic point obtained by mapping a public elliptic point by the L^e-isogeny as an intermediate value determined from the elliptic point T.

The controller 31 does not cause the L-isogeny calculator 33 to perform the calculation at Process Step 6 in the iteration from i=e_L−1 to i=e_L−e+1 in FIG. 2. Then, at Process Step 6 in the iteration i=e_L−e in FIG. 2, the controller 31 reads the pre-calculated value indicating the elliptic point determined by trunc(sk_L, e) obtained by the mapping by the L^e-isogeny, and uses the read pre-calculated value as the calculation result at Process Step 6.

Variation 1 reduces the number of times of the L-isogeny calculation by e times per one elliptic point of the public parameters, thus, being capable of further increasing the speed of the L^e_L-isogeny calculation.

Variation 2

In the example of Variation 2, the isogeny calculation device 100 pre-calculates (holds as the pre-calculated value) not only the elliptic point T at Process Step 3 in FIG. 2, but also an intermediate value AC corresponding to a coefficient of the elliptic curve at Process Step 4.

The controller 31 does not cause the L-isogeny calculator 33 to perform the calculation at Process Step 4 in the iteration from i=e_L−1 to i=e_L−e in FIG. 2. The controller 31 reads the pre-calculated value indicating the intermediate value AC corresponding to the coefficient of the elliptic curve determined by trunc(sk_L, e_L−i), and uses the read pre-calculated value as the calculation result at Process Step 4.

Variation 2 reduces the number of times of the calculation for the intermediate value AC corresponding to the coefficient of the elliptic curve by e times, thus, being capable of further increasing the speed of the L^e_L-isogeny calculation.

Variation 3

Variation 3 will be described later with reference to FIG. 7.

Variation 4

Process Step 4 in FIG. 2 is outlined as the calculation of the coefficient of the elliptic curve. In reality, however, an intermediate value K to be used in the L^e_L-isogeny calculation at Process Steps 5 and 6 and the intermediate value AC to be used in the calculation of the L-point multiplication at Process Step 3 in the next iteration are calculated from the elliptic point T at Process Step 4.

In the example of Variation 4, the isogeny calculation device 100 pre-calculates (holds as the pre-calculated values) the intermediate value K and the intermediate value AC instead of the elliptic point T. That is, the isogeny calculator 3 is allowed to store the intermediate value K to be used in the calculation of the L-isogeny as the pre-calculated value determined from the elliptic point T and calculate the L-isogeny using the intermediate value K. The isogeny calculator 3 is also allowed to store the intermediate value AC to be used in the calculation of the L-point multiplication as the pre-calculated value determined from the elliptic point T and calculate the L-point multiplication using the intermediate value AC. The intermediate value AC corresponds to the coefficient of the elliptic curve mapped by mapping a public elliptic curve including the elliptic point S by the isogeny.

The controller 31 does not cause the L-isogeny calculator 33 to calculate the intermediate value K at Process Step 4 in the iteration from i=e_L−1 to i=e_L−e in FIG. 2. The controller 31 reads the pre-calculated value indicating the intermediate value K determined by trunc(sk_L, e_L−i), and uses the intermediate value K as the calculation result at Process Step 4.

The controller 31 does not cause the L-isogeny calculator 33 to calculate the intermediate value AC at Process Step 4 in the iteration from i=e_L−1 to i=e_L−e+1 in FIG. 2. The controller 31 reads the pre-calculated value indicating the intermediate value AC determined by trunc(sk_L, e) at Process Step 4 in the iteration i=e_L−e in FIG. 2, and uses the intermediate value AC as the calculation result at Process Step 4.

Variation 4 reduces the amount of calculation of the intermediate values K and AC, thus, being capable of further increasing the speed of the $L\hat{\ }e\_L$-isogeny calculation.

FIG. 7 summarizes Variations 1 to 4 described above.

FIG. 7 is a chart illustrating the examples of the variations of the pre-calculated values of the embodiment. The example number 0 illustrates the pre-calculated value of the embodiment described above. The example number 1 illustrates Variation 1 of the pre-calculated values of the embodiment described above. The example number 2 illustrates Variation 2 of the pre-calculated values of the embodiment described above. The example number 3 illustrates Variation 3 of the pre-calculated values of the embodiment. The example number 4 illustrates Variation 4 of the pre-calculated values of the embodiment described above.

The examples number 1 to number 4 in FIG. 7 may be applied any strategy, not only to the strategy by Algorithm A in FIG. 2. For example, a strategy indicating a tree structure that determines the order of calculation of the L-point multiplication and the L-isogeny calculation and the number of calculations of the L-point multiplication and the L-isogeny may be received, and may perform the L-isogeny calculation and the L-point multiplication calculation based on the strategy. However, in the example number 4, the $L\hat{\ }e\_L$-isogeny may not be calculated correctly depending on the combination of the strategy with the positive integer e because interim values of the intermediate values AC are not held. In order to avoid the incapability of correct calculation, only values required for the calculation may be read from among the interim values of the intermediate values AC in the example number 4, in the same way as in the example number 3. When the example number 4 is applied, a combination between a strategy and a positive integer e that may lead to incorrect calculation may be avoided to be used.

In the SIKE, for a higher efficiency, the x-coordinates of P_L, Q_L, R_L=P_L−Q_L are used instead of {P_L, Q_L}. The x-coordinates of $\varphi\_L\hat{\ }e(P\_L')$, $\varphi\_L\hat{\ }e(Q\_L')$, and $\varphi\_L\hat{\ }e(R\_L')$ may be used in the same way for the pre-calculated values in the $L\hat{\ }e$-isogeny of the public parameters.

The intermediate value K is not limited to a single value, but may be a set of a plurality of values. In the same way, the intermediate value AC is not limited to a single value, but may be a set of a plurality of values. The intermediate value K may not be calculated depending on the positive integer L.

Examples of Intermediate Values K and AC

The following illustrates specific examples of using algorithms in Non-Patent Literature 1 for the intermediate values K and AC. When L=2, the calculation at Process Step 4 of Algorithm A may be performed using Algorithm 11 of Non-Patent Literature 1. The calculations at Process Steps 5 and 6 may be performed using Algorithm 12 of Non-Patent Literature 1. In Algorithm 11 of Non-Patent Literature 1, a set of two values (A_24^+, C_24) is calculated as the intermediate values AC instead of coefficients A and C of the curve. In Algorithm 11, A_24^+:C_24=(A+2C):4C. The values (A_24^+, C_24) are used to calculate the point doubling.

Another example is a method of calculating a set of two values (A_24^−, C_24) as the intermediate values AC. In this method, A_24^−:C_24=(A−2C):4C. The values (A_24^−, C_24) are used to calculate the point doubling. Algorithm 12 of Non-Patent Literature 1 does not use the intermediate value K.

When L=4, the calculation at Process Step 4 of Algorithm A may be performed using Algorithm 13 of Non-Patent Literature 1, and the calculations at Process Steps 5 and 6 may be performed using Algorithm 14 of Non-Patent Literature 1. In Algorithm 13 of Non-Patent Literature 1, a set of two values (A_24^+, C_24) is calculated as the intermediate values AC instead of the coefficients A and C of the curve.

Still another example is a method of calculating a set of two values (A_24^−, C_24) as the intermediate values AC. In Algorithm 14 of Non-Patent Literature 1, a set of three values (K_1, K_2, K_3) is used as the intermediate values K. Therefore, (K_1, K_2, K_3) are calculated as the intermediate values K in Algorithm 13 of Non-Patent Literature 1. When the elliptic point T is a kernel, $K\_1=4Z\_T\hat{\ }2$, K_2=X_T−Z_T, and K_3=X_T+Z_T. X_T denotes the X-coordinate in the projective coordinates of the elliptic point T, and Z_T denotes the Z-coordinate in the projective coordinates of the elliptic point T.

When L=3, the calculation at Step 4 of Algorithm A may be performed using Algorithm 15 of Non-Patent Literature 1, and the calculations at Process Steps 5 and 6 may be performed using Algorithm 16 of Non-Patent Literature 1. In Algorithm 15 of Non-Patent Literature 1, a set of two values (A_24^+, A_24^−) is calculated as the intermediate values AC instead of the coefficients A and C of the curve. In Algorithm 15, A_24^+:A_24^−=(A+2C):(A−4C). The vales (A_24^+, A_24^−) are used to calculate point tripling. In Algorithm 16 of Non-Patent Literature 1, a set of two values (K_1, K_2) is used as the intermediate values K. Therefore, (K_1, K_2) are calculated as the intermediate values K in Algorithm 15 of Non-Patent Literature 1. When the elliptic point T is a kernel, K_1=X_T−Z_T, and K_2=X_T+Z_T.

Public Key Generation Process

The isogeny calculation device 100 of the embodiment performs the public key generation process using the pre-calculated values illustrated in FIG. 7 for the public key generation process.

The sampler 1 supplies the secret key sk_L to the scalar multiplier 2. The scalar multiplier 2 supplies the elliptic point S_L calculated from the secret key sk_L by performing the scalar multiplication to the isogeny calculator 3, and the isogeny calculator 3 outputs the public keys pk_L={E_0/ <S_L>, $\varphi\_L\hat{\ }e\_L(P\_L')$, $\varphi\_L\hat{\ }e\_L(Q\_L')$} The public parameters are {E_0, P_L, Q_L, P_L', Q_L'}. <S_L> is determined by the scalar multiplication S_L=P_L+[sk_L] Q_L, and $\varphi\_L\hat{\ }e\_L$ is determined by the $L\hat{\ }e\_L$-isogeny calculation.

Since the pre-calculated values illustrated in FIG. 7 are used for the $L\hat{\ }e\_L$-isogeny calculation processing that accounts for a large percentage of the number of execution cycles, the processing speed of the isogeny calculation in the public key generation process can be improved.

The sampler 1 may sample the secret key sk_L as a random number sk_L from the key space K_L, or may receive the secret key sk_L as input from outside.

Shared Key Establishment Process

The isogeny calculation device 100 of the embodiment also performs the shared key establishment process using the pre-calculated values illustrated in FIG. 8 to be explained below for the shared key establishment process.

The isogeny calculator 3 receives the input of the secret key sk_L and a public key pk_L'={E_0/<S_L'>, φ_L'^e_L' (P_L), φ_L'^e_L'(Q_L)}, and outputs the shared key j (j-invariant). Specifically, the shared key establishment process includes a process to calculate scalar multiplication φ_L'^e_L' (S_L)=φ_L'^e_L' (P_L)+[sk_L]φ_L'^e_L'(Q_L), a process to calculate the L^e_L-isogeny φ'_L^e_L, and a process to calculate the j-invariant.

In the public key generation process, the elliptic points obtained by performing the L-point multiplication and the L-isogeny mapping on the public parameters are set as the pre-calculated values. However, in the shared key establishment process, the elliptic points obtained by performing the L-point multiplication and the L-isogeny mapping on the public key are set as the pre-calculated values. Since the shared key establishment process does not output the public key, the mapping of the public parameters by the L^e-isogeny is not required.

FIG. 8 is a chart illustrating examples of the variations of the pre-calculated values in the shared key establishment process of the embodiment. The example number 0' illustrates the pre-calculated value of the embodiment described above. The example number 2' illustrates Variation 2' of the pre-calculated values of the embodiment described above. The example number 3' illustrates Variation 3' of the pre-calculated values of the embodiment described above. The example number 4' illustrates Variation 4' of the pre-calculated values of the embodiment described above.

The reason why FIG. 8 includes no example number 1' is that the example number 1' is the same as the example number 0'. The examples number 2' to number 4' in FIG. 8 may be applied to any strategy. However, in the example number 4', the calculation may not be performed correctly depending on the combination of the strategy with the positive integer e because interim values of the intermediate values AC are not held. In order to avoid the incapability of correct calculation, only values required for the calculation may be read from among the interim values of the intermediate values AC in the example number 4', in the same way as in the example number 3'. When the example number 4' is applied, a combination between a strategy and a positive integer e that may lead to incorrect calculation may be avoided to be used.

Processes for Encryption, Decryption, Key Encapsulation, and Key Decapsulation

The isogeny calculation device 100 of the embodiment may perform the encryption and decryption processes in the isogeny-based cryptography and the key encapsulation and decapsulation processes in the KEM by performing the L^e_L-isogeny calculation that reads the pre-calculated values, and using the public key generation process and the shared key establishment process. The isogeny calculation device 100 of the embodiment may also perform other cryptography algorithm processes using the L^e_L-isogeny calculation that reads the pre-calculated values.

Variations of Calculation Method

The isogeny calculator 3 of the embodiment may perform, for example, the L^e_L-isogeny calculation, the public key generation process, and the shared key establishment process using a method other than the repetition of the combination of the L-point multiplication and the L-isogeny. For example, the isogeny calculator 3 of the embodiment may use a method of repeatedly performing a combination of the L-point multiplication (where L is a positive integer) and the M-isogeny (where M is a positive integer).

Specifically, for example, the memory of the isogeny calculation device 100 of the embodiment may store, as a pre-calculated value, an intermediate value among the intermediate values used for the isogeny calculation that is determined from the elliptic point T obtained by repeatedly performing the L-point multiplication (where L is a positive integer) and the M-isogeny (where M is a positive integer) on the elliptic point S serving as a kernel of the isogeny. Then, after the isogeny calculator 3 receives the input of the elliptic point S and the lower e digits of an L-adic representation of the secret key sk, the isogeny calculator 3 may calculate the M-isogeny of the elliptic point S using the pre-calculated value determined from the elliptic point T identified by the lower e digits of the L-adic representation of the secret key sk, and calculate an intermediate value or a j-invariant determined from an elliptic curve mapped by mapping a public elliptic curve including the elliptic point S by the isogeny based on the M-isogeny of the elliptic point S.

The isogeny calculator 3 may calculate the M-isogeny of the public elliptic point on the public elliptic curve including the elliptic point S using the pre-calculated value read from the memory, and calculate the elliptic point mapped by mapping the public elliptic point by the isogeny based on the M-isogeny of the public elliptic point. For example, the pre-calculated value includes the elliptic point obtained by mapping the public elliptic point by the L^e-isogeny. The isogeny calculator 3 identifies the elliptic point T serving as a kernel of the M-isogeny according to the lower e digits of the L-adic representation of the secret key sk, and reads the elliptic point obtained by mapping the public elliptic point by the L^e-isogeny, as the intermediate value determined from the elliptic point T.

The isogeny calculator 3 may receive a strategy indicating a tree structure that determines the order of calculation of the L-point multiplication and the M-isogeny calculation and the number of calculations of the L-point multiplication and the M-isogeny, and may perform at least one of the M-isogeny calculation and the L-point multiplication calculation based on the strategy.

For example, the isogeny is the L^e_L-isogeny (where e_L is a positive integer), and M=L^m (where m is a positive integer). In this case, for example, the elliptic point T mentioned above is a value that can be taken by performing (e_L−1) times the L-point multiplication and the M-isogeny mapping (which corresponds to m times the L-isogeny, in terms of the number of times of execution) on the elliptic point S mentioned above. For example, the elliptic point T mentioned above is a value that can be taken by performing the L-point multiplication by (e_L−e) times and the M-isogeny mapping, on the elliptic point S mentioned above.

The isogeny calculation device 100 of the embodiment may also change the method of calculating the L^e_L-isogeny depending on the positive integer e_L. For example, when the positive integer e_L is an even number, the L^e_L-isogeny may be calculated using a method other than the repetition of the combination of the L-point multiplication and the L-isogeny.

For example, when the positive integer e_L is an even number, the L^e_L-isogeny may be calculated by repeating a combination of performing L^2-point multiplication once and performing the L-isogeny mapping twice. For example, when the positive integer e_L is an even number, the L^e_L-isogeny may also be calculated by repeating a combination of performing the L-point multiplication twice and performing the M (=L^2)-isogeny mapping once.

Specifically, when L=2, the calculation of L^e_2-isogeny may be performed by repeating a combination of performing the point doubling twice and performing 4-isogeny once.

The calculation of the $L^{e\_2}$-isogeny may be performed by changing the combination for each iteration.

In the same way, when the positive integer $e\_L$ is a multiple of 3, the $L^{e\_L}$-isogeny may be calculated not only by combining the L-point multiplication with the L-isogeny, but also by combining together $L^3$-point multiplication, the $L^2$-point multiplication, $L^3$-isogeny, and $L^2$-isogeny.

When the positive integer $e\_L$ is an odd number, the $L^{e\_L}$-isogeny may be calculated by combining together the $L^2$-point multiplication, the L-point multiplication, the $L^2$-isogeny, and the L-isogeny.

Using the $L^2$-isogeny reduces the number of the pre-calculated values for the same e, and requires smaller memory size. When the positive integer e is an even number, setting the pre-calculated values to values that can be taken by elliptic points $L^{(e\_L-2)}]S\_L$, $[L^{(e\_L-4)}]\varphi\_L^2(S\_L), \ldots, [L^{(e\_L-e)}]\varphi\_L^2(e/2-1)$ $(S\_L)$ is better than setting the pre-calculated values to values that can be taken by the elliptic points $[L^{(e\_L-1)}]S\_L$, $[L^{(e\_L-2)}]\varphi\_L(S\_L)$, $[L^{(e\_L-3)}]$ $\varphi\_L^2(S\_L), \ldots, [L^{(e\_L-e)}]$ $\varphi\_L^{(e-1)}$ $(S\_L)$ from the viewpoint of the memory size.

For example, when e=4, $L^2$ kinds of elliptic points $[L^{(e\_L-2)}]S\_L$ and $L^4$ kinds of elliptic points $[L^{(e\_L-4)}]\varphi\_L^2(S\_L)=[L^{(e\_L-e)}]\varphi\_L^2(e/2-1)$ $(S\_L)$ only need to be held instead of holding L kinds of elliptic points $[L^{(e\_L-1)}]S\_L$, $L^2$ kinds of elliptic points $[L^{(e\_L-2)}]$ $\varphi\_L(S\_L)$, $L^3$ kinds of elliptic points $[L^{(e\_L-3)}]\varphi\_L^2$ $(S\_L)$, and $L^e=L^4$ kinds of elliptic points $[L^{(e\_L-e)}]\varphi\_L^{(e-1)}$ $(S\_L)$.

As a result, the number of the pre-calculated values decreases by the number of the L kinds of the elliptic points $[L^{(e\_L-1)}]S\_L$ and the $L^3$ kinds of elliptic points $[L^{(e\_L-3)}]\varphi\_L^2(S\_L)$. In the same way, when the positive integer e is an odd number, using the $L^2$-isogeny and the L-isogeny reduces the number of the pre-calculated values. The number of the pre-calculated values can be reduced not only when the elliptic points T are used to set the precalculated values, but also when the coefficients of the elliptic curve and the intermediate values K and AC are used as precalculated values.

As described above, in the isogeny calculation device 100 of the embodiment, the memory stores, as the pre-calculated value, the intermediate value among the intermediate values used for the isogeny calculation that is determined from the elliptic point T obtained by repeatedly performing the L-point multiplication (where L is a positive integer) and the M-isogeny (where M is a positive integer) on the elliptic point S serving as a kernel of the isogeny. Then, the isogeny calculator 3 identifies the elliptic point T serving as the kernel of the M-isogeny according to the lower e digits (where e is a positive integer) of the L-adic representation of the secret key sk that determines the elliptic point S, reads the pre-calculated value determined from the elliptic point T from the memory, and calculates at least one of the L-point multiplication and the M-isogeny using the pre-calculated value read from the memory.

The isogeny calculation device 100 of the embodiment can improve the processing speed of the isogeny calculation. Specifically, since the number of calculations of the L-point multiplication and the L-isogeny in the $L^{e\_L}$-isogeny calculation can be reduced, the $L^{e\_L}$-isogeny calculation can be quickened. This feature can reduce the number of execution cycles of the public key generation and the shared key establishment in the key sharing scheme, the safety of which being based on the isogeny problems. The feature can also reduce the number of execution cycles of the key generation, the encryption, the decryption, the key encapsulation, and the key decapsulation in the isogeny-based cryptography and the KEM that are configured using the key sharing scheme.

The following finally describes an example of hardware configuration of the isogeny calculation device 100 of the embodiment. The isogeny calculation device 100 of the embodiment can be implemented, for example, using any computer device as basic hardware.

Example of Hardware Configuration

Figure 9:
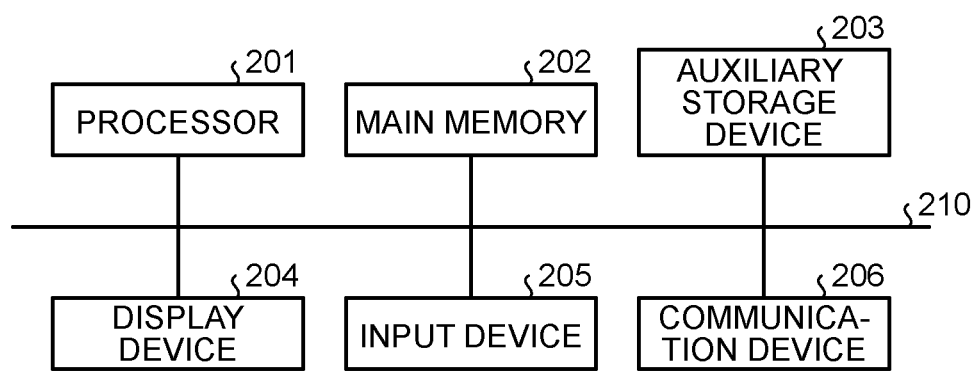
FIG. 9 is a diagram illustrating an exemplary hardware configuration of the isogeny calculation device of the embodiment.

FIG. 9 is a diagram illustrating the example of the hardware configuration of the isogeny calculation device 100 of the embodiment. The isogeny calculation device 100 of the embodiment includes a processor 201, a main memory 202, an auxiliary storage device 203, a display device 204, an input device 205, and a communication device 206. The processor 201, the main memory 202, the auxiliary storage device 203, the display device 204, the input device 205, and the communication device 206 are connected together via a bus 210.

The isogeny calculation device 100 may exclude some of the components listed above. For example, when the isogeny calculation device 100 can use an input function and a display function of an external device or devices, the isogeny calculation device 100 need not include the display device 204 and the input device 205.

The processor 201 executes the computer program read from the auxiliary storage device 203 to the main memory 202. The main memory 202 includes memories such as a read-only memory (ROM) and a random-access memory (RAN). The auxiliary storage device 203 includes a hard disk drive (HDD), a memory card, and the like.

The display device 204 is, for example, a liquid crystal display. The input device 205 is an interface for operating the isogeny calculation device 100. The display device 204 and the input device 205 may be implemented by a touch panel or the like having an input function and a display function. The communication device 206 is an interface for communicating with other devices.

For example, the computer program to be executed by the isogeny calculation device 100 is provided as a computer program product by being recorded, as a file having an installable format or an executable format, on a computer-readable storage medium such as a memory card, a hard disk, a compact disc-rewritable (CD-RW), a compact disc read-only memory (CD-ROM), a compact disc-recordable (CD-R), a digital versatile disc-random access memory (DVD-RAM), or a digital versatile disc-recordable (DVD-R).

For example, the computer program to be executed by the isogeny calculation device 100 may be stored on a computer connected to a network such as the Internet, and provided by being downloaded via the network.

For example, the computer program to be executed by the isogeny calculation device 100 may be provided via a network such as the Internet without being downloaded. Specifically, the isogeny calculation process may be executed by what is called an application service provider (ASP) service in which the computer program is not transferred from a server computer, but functions of the process are implemented through execution instructions of the computer program and acquisition of the results of the execution.

The computer program for the isogeny calculation device 100 may be provided by being incorporated into a ROM or the like.

The computer program executed on the isogeny calculation device 100 has a modular configuration including functions that can also be implemented by the computer program among the functional configurations described above. As the actual hardware, the processor 201 reads the computer program from the storage medium and executes it to load the functional blocks described above as the functions into the main memory 202. That is, each of the functional blocks described above is generated in the main memory 202.

One, some, or all of the functions described above may be implemented by hardware such as an integrated circuit (IC), instead of being implemented by software.

A plurality of the processors 201 may be used to implement the functions. In that case, each of the processors 201 may implement one of the functions or two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An isogeny calculation device comprising:
   a memory configured to store, as a pre-calculated value, an intermediate value, among a plurality of intermediate values used for isogeny calculation, which is determined from an elliptic point T obtained by repeatedly performing L-point multiplication (where L is a positive integer) and M-isogeny (where M is a positive integer) on an elliptic point S serving as a kernel of the isogeny; and
   an isogeny calculator configured to identify the elliptic point T serving as the kernel of the M-isogeny according to lower e digits (where e is a positive integer) of an L-adic representation of a secret key sk that determines the elliptic point S, read the pre-calculated value determined from the elliptic point T from the memory, and perform at least one of calculations of the L-point multiplication and the M-isogeny by using the pre-calculated value read from the memory.

2. The device according to claim 1, wherein the isogeny calculator is configured to store an intermediate value K to be used in the calculation of the M-isogeny as the pre-calculated value determined from the elliptic point T, and perform the M-isogeny calculation by using the intermediate value K.

3. The device according to claim 1, wherein the isogeny calculator is configured to store an intermediate value AC to be used in the calculation of the L-point multiplication as the pre-calculated value determined from the elliptic point T, and perform the L-point multiplication calculation by using the intermediate value AC.

4. The device according to claim 3, wherein the intermediate value AC corresponds to a coefficient of an elliptic curve mapped by mapping a public elliptic curve including the elliptic point S by the isogeny.

5. The device according to claim 1, wherein the isogeny calculator is configured to, upon receiving input of the elliptic point S and the lower e digits of the L-adic representation of the secret key sk, perform the M-isogeny calculation of the elliptic point S by using the pre-calculated value determined from the elliptic point T identified by the lower e digits of the L-adic representation of the secret key sk, and calculate an intermediate value or a j-invariant determined from an elliptic curve mapped by mapping a public elliptic curve including the elliptic point S by the isogeny based on the M-isogeny of the elliptic point S.

6. The device according to claim 1, wherein the isogeny calculator is configured to perform the M-isogeny calculation of a public elliptic point on a public elliptic curve including the elliptic point S by using the pre-calculated value read from the memory, and calculate an elliptic point mapped by mapping the public elliptic point by the isogeny based on the M-isogeny of the public elliptic point.

7. The device according to claim 6, wherein
   the pre-calculated value includes an elliptic point obtained by mapping the public elliptic point by $L^e$-isogeny, and
   the isogeny calculator is configured to identify the elliptic point T serving as the kernel of the M-isogeny according to the lower e digits of the L-adic representation of the secret key sk, and read the elliptic point obtained by mapping the public elliptic point by the $L^e$-isogeny, as the intermediate value determined from the elliptic point T.

8. The device according to claim 1, wherein the isogeny calculator is configured to receive a strategy indicating a tree structure that determines an order of calculation of the L-point multiplication and the M-isogeny calculation and a number of calculations of the L-point multiplication and the M-isogeny, and perform at least one of the M-isogeny calculation and the L-point multiplication calculation based on the strategy.

9. The device according to claim 1, wherein
   the isogeny is $L^{e\_L}$-isogeny (where e_L is a positive integer),
   the M is $L^m$ (where m is a positive integer), and
   the elliptic point T is a value taken by performing (e_L−1) times the L-point multiplication and the M-isogeny on the elliptic point S.

10. The device according to claim 1, wherein
    the isogeny is $L^{e\_L}$-isogeny (where e_L is a positive integer),
    the M is $L^m$ (where m is a positive integer), and
    the elliptic point T is a value taken by performing the L-point multiplication by (e_L−e) times and the M-isogeny on the elliptic point S.

11. An isogeny calculation method comprising:
    by an isogeny calculation device, storing, as a pre-calculated value, an intermediate value, among a plurality of intermediate values used for isogeny calculation, which is determined from an elliptic point T obtained by repeatedly performing L-point multiplication (where L is a positive integer) and M-isogeny (where M is a positive integer) on an elliptic point S serving as a kernel of the isogeny; and
    by the isogeny calculation device, identifying the elliptic point T serving as the kernel of the M-isogeny according to lower e digits (where e is a positive integer) of an L-adic representation of a secret key sk that determines the elliptic point S, reading the pre-calculated value determined from the elliptic point T from a memory, and performing at least one of calculations of the L-point multiplication and the M-isogeny by using the pre-calculated value read from the memory.

12. A computer program product comprising a non-transitory computer-readable medium including programmed instructions, the instructions causing a computer to function as:

a memory to store, as a pre-calculated value, an intermediate value, among a plurality of intermediate values used for isogeny calculation, which is determined from an elliptic point T obtained by repeatedly performing L-point multiplication (where L is a positive integer) and M-isogeny (where M is a positive integer) on an elliptic point S serving as a kernel of the isogeny; and an isogeny calculator to identify the elliptic point T serving as the kernel of the M-isogeny according to lower e digits (where e is a positive integer) of an L-adic representation of a secret key sk that determines the elliptic point S, read the pre-calculated value determined from the elliptic point T from the memory, and perform at least one of calculations of the L-point multiplication and the M-isogeny by using the pre-calculated value read from the memory.

* * * * *